S. W. LEE.
TONGS.
APPLICATION FILED FEB. 23, 1911.
990,994.  Patented May 2, 1911.
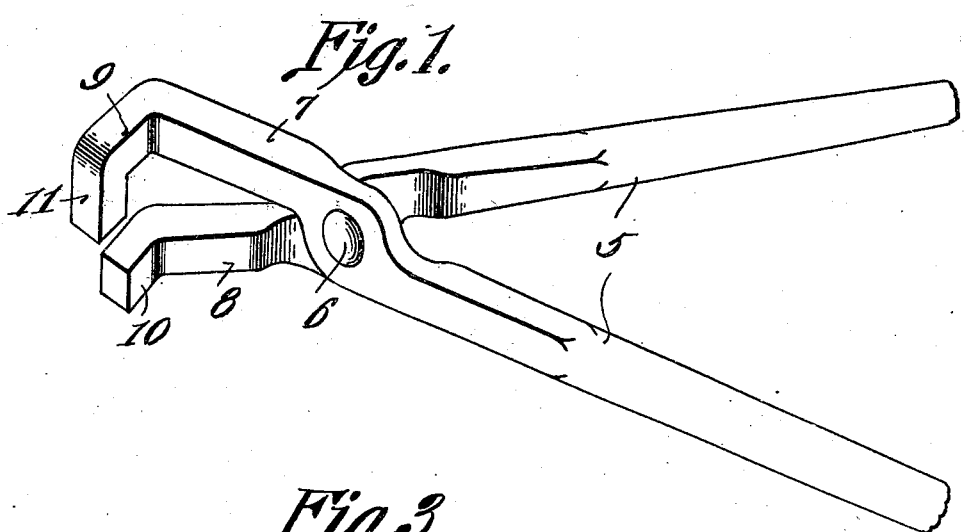
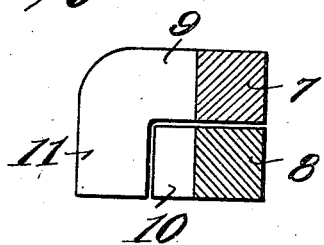
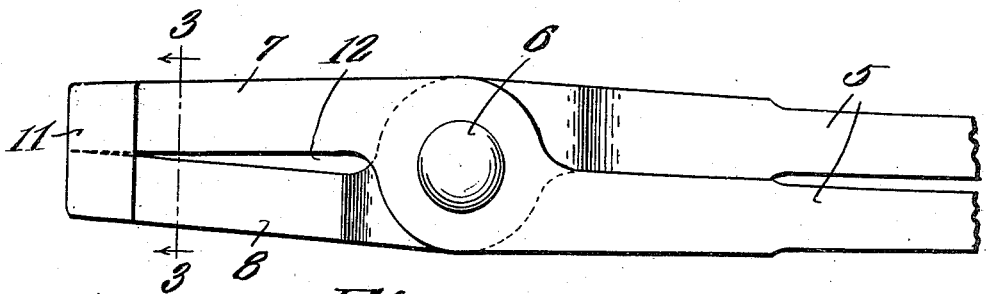
Witnesses
Samuel W. Lee,
Inventor
by C. A. Snow & Co.
Attorneys

UNITED STATES PATENT OFFICE.

SAMUEL W. LEE, OF HAUGHTON, LOUISIANA.

TONGS.

990,994.     Specification of Letters Patent.     Patented May 2, 1911.

Application filed February 23, 1911. Serial No. 610,278.

*To all whom it may concern:*

Be it known that I, SAMUEL W. LEE, a citizen of the United States, residing at Haughton, in the parish of Bossier and State of Louisiana, have invented a new and useful Tongs, of which the following is a specification.

This invention relates to tools, and more especially to tongs having crossed handles; and the object of the same is to produce a tool for the blacksmith's use in handling plow shares, shovel blades, and other articles which have through them a bolt hole at or near the heel. This object is accomplished by constructing the tool as hereinafter more fully described and claimed and as shown in the drawings wherein—

Figure 1 is a perspective view of this tool with its jaws open. Fig. 2 is an elevation thereof with the jaws closed. Fig. 3 is a cross section on the line 3—3 of Fig. 2.

In the drawings the numeral 5 designates handles crossing and pivoted to each other at the point 6 where each is slightly deflected out of a straight line as usual so that the jaws shall lie approximately in contact when the handles also lie in contact as seen in Fig. 2. The jaws are respectively numbered 7 and 8, and by preference are substantially rectangular in cross section as best seen in Fig. 3, the upper jaw having at its extremity a foot 9 and the lower jaw a similar foot 10 both projecting at right angles to the length of the jaw itself and continuing the contour thereof as illustrated. The adjacent faces of the jaws and feet are flat so as to form working faces for the tool, and as thus far described the latter simulates the blacksmith's tongs now so commonly employed, excepting only that the tips of its jaws are not herein shown as reduced in thickness and the extremities of the jaws which I do use have the laterally projecting feet described. It is obvious, however, that any ordinary object may be grasped and handled by the tongs if it enter between the jaw faces at the right side of the tool shown in Figs. 1 and 3.

The essential and specific feature of construction of my improved tongs which renders them applicable especially to plow shares and other articles which have holes near their heels, consist in the provision at the outer end of the uppermost foot 9 of a downturned hook 11, and this hook preferably follows the contour of the foot 9 the same as the latter follows the contour of the jaw 7; in other words, in making this member it will probably be rolled out hot into substantially square cross section, then given a bend to the left to produce the foot 9, and then given a bend downward to produce the hook 11. The length of the latter, as seen in Fig. 3, is such that when the jaws are closed together the end of the hook depends to a line about even with the lower side or outer face of the lower jaw 8, and the inner side of the hook extends across the outer end of this jaw. The parts are of such size and material as will best adapt the tool to the work it is to perform.

In making tongs for special use it is common to leave an opening, as at 12 in Fig. 2, between the inner portions of the jaw faces and to shape the latter and the opening so that when the tool grasps the article which it is intended to hold the jaw faces will stand in exact parallelism. This detail of construction I claim the right to use, because it is well known in the art of making tools of this character, and it does not interfere with my providing the specific hook 11 described above.

It is well known to blacksmiths and others who have had to use the ordinary tongs for picking up and holding plow shares, shovel blades, and other shapes of flat articles which have holes through them, that in the handling of the articles, and especially where they are pounded on or otherwise treated by tools or machines while so held in the tongs, care and pressure must be exercised to hold the articles so that they will not be deflected in their position within nor drawn out of the grasp of the jaws while under treatment. To secure this end the jaw faces have been serrated, the pivoting of the handles has been amplified so as to give them a compound leverage, and many other expedients have been devised for bringing about the end in view; but I have found that the presence of a hook such as shown and described and which will pass through a hole in the article being treated, gives the tool a safeguard against the loss of its grip upon the article which cannot be duplicated in any other way. Especially when the hole in the article is square and the shape of the hook is made to correspond with the hole in shape and size, is the hook valuable because it then not only prevents the loss of the grip of the tongs thereon but it prevents the article from turning while grasped between the jaw faces. Obviously the material and proportions of parts of this device are not essential to the invention.

What is claimed is:

The herein described tongs for blacksmith's use, the same comprising two members crossing each other and pivoted where they cross, their rear ends constituting handles and their front ends constituting jaws having flat adjacent faces, the lower jaw projecting substantially straight from the pivot and bent to one side in a lateral foot, and the upper jaw projecting also straight from the pivot, then bent aside into a lateral foot standing above that of the lower jaw, and the outer end of said foot bent downward into a hook which is square in cross section and whose inner face passes across the outer end of the foot of the lower jaw.

In testimony that I claim the foregoing as my own, I have hereto affixed my signature in the presence of two witnesses.

SAMUEL W. LEE.

Witnesses:
J. B. HALL,
A. H. RATCLIFF.

---

Copies of this patent may be obtained for five cents each, by addressing the "Commissioner of Patents, Washington, D. C."